Feb. 13, 1940.                H. J. REITER                 2,189,995
                          SNAP FASTENER SACKET
                          Filed June 8, 1938
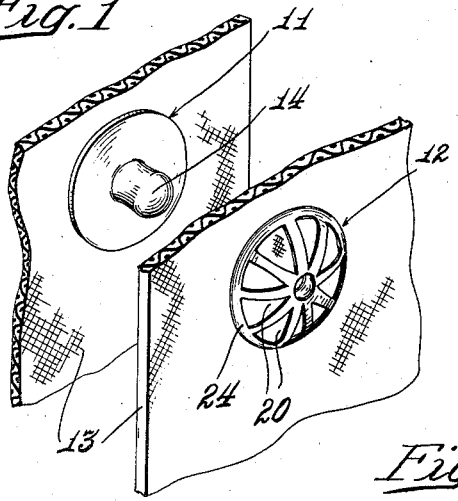
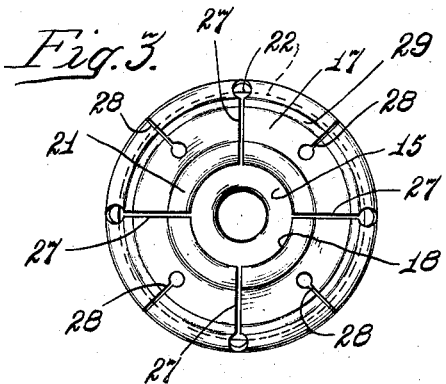
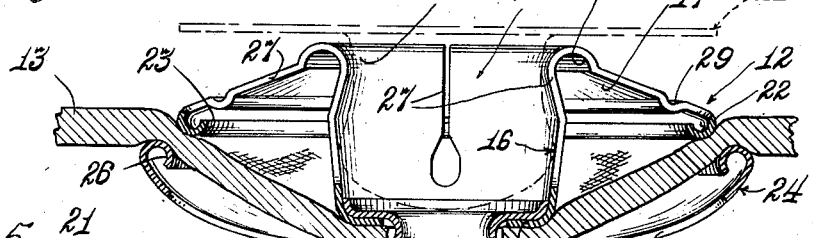
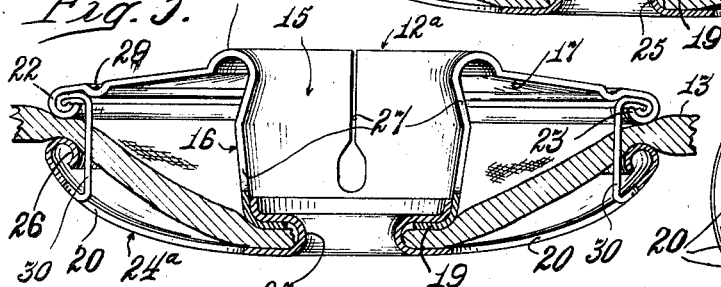
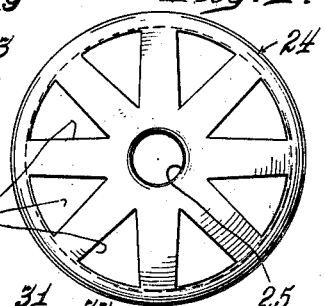
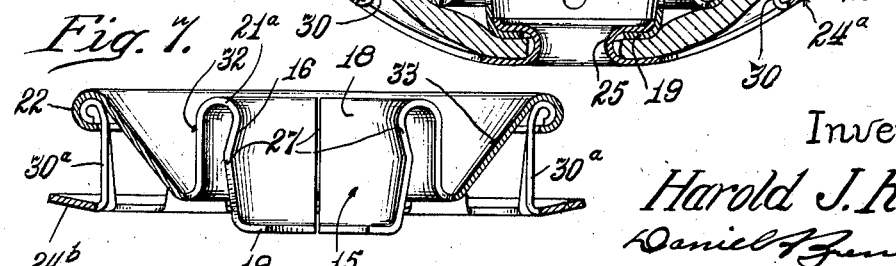
Inventor
Harold J. Reiter.
Daniel ⎯⎯⎯⎯
Attorney Patented Feb. 13, 1940

2,189,995

UNITED STATES PATENT OFFICE 2,189,995

SNAP FASTENER SOCKET

Harold J. Reiter, Chicago, Ill.

Application June 8, 1938, Serial No. 212,456

3 Claims. (Cl. 24—217)

The invention relates to a separable snap fastener and more particularly to its female member, said member embodying novel structural features to effect a reinforced yieldable structure providing for easy insertion of and interlocking engagement with its associated male member.

An object of the invention is to provide an integral female member for snap fasteners embodying novel structural features to provide a reinforced yieldable socket.

Another object is to provide a female member for snap fasteners, embodying a yieldable but enduring firm snap action socket and a non-yieldable periphery.

Another object is to provide an integral female member for snap fasteners which includes a yieldable triple wall socket capable of firm easy interlocking engagement with an associated stud.

Another object is to provide a female member for snap fasteners including a novelly constructed yieldable cap or securing element.

The foregoing and such other objects of the invention as will more fully appear hereinafter as the description proceeds, will be more readily understood from a perusal of the following specification, reference being had to the accompanying drawing, in which:

Fig. 1 is a perspective view of a snap fastener embodying features of the invention, showing the members separated.

Fig. 2 is an enlarged central sectional view of one form of female member, showing the male member in dotted lines.

Fig. 3 is a top plan view of the female member shown in Fig. 2.

Fig. 4 is a bottom plan view of the female member shown in Fig. 2.

Fig. 5 is a sectional view similar to Fig. 2, showing a modified structure.

Fig. 6 is a sectional view similar to Fig. 2, showing a modified form of female member.

Fig. 7 is a sectional view similar to Fig. 6, showing another modified form of female member.

In the accompanying drawing like numerals identify like parts.

Referring to Figs. 1 to 4, inclusive, the snap fastener there illustrated consists of male and female members 11 and 12, respectively. Said members are secured, respectively, to separate complemental portions of fabric 13, leather or other material, and arranged to detachably interlock to hold said portions together. The male member 11 may be of any known construction wherein its interlocking stud 14 is enlarged at its free end to co-act with an interlocking socket 15 of the female member 12.

As best shown in Fig. 2, the female member 12 is formed integral, preferably from a thin circular sheet of metal. A substantially cylindrical wall 16 is formed by striking or drawing the metal of the body 17 downwardly to provide the socket 15. Said wall preferably is tapered inwardly toward each end. The taper at the upper end provides an entrance 18 slightly less in diameter than the largest diameter of the stud 14 to afford detachable interlocking engagement of the members 11 and 12. The bearing surface of the lower circumferential edge of the wall 16 is increased by spinning it inwardly and forming an internal reinforcing flange 19.

The body portion 17 of the female member 11 comprises an external flange flaring downwardly and outwardly slightly, an annular corrugation 21 connecting said flange and the wall 16, a reinforcing bead 22 at its circumferential margin, and a resilient groove 29 between the said bead and said corrugation.

The bead 22 is formed by spinning the circumferential margin of the flange downwardly and inwardly sufficiently to leave a space between its free terminal 23 and the flange of the body portion to guide the insertion, into the bead 22, of securing tangs provided on certain forms of securing members hereinafter described.

The female member may be secured to the material 13 by a suitable cap 24 which preferably is formed substantially concavo-convex as shown, and has an internal upstanding tubular portion 25 which, when the cap and the female member are assembled, pierces the material 13 and then is rolled, spun or otherwise clinched over the inside face of the reinforcing flange 19. The circumferential edge of the cap also preferably is spun upwardly and inwardly to provide a circumferential resilient bead 26. As shown in Fig. 2, the outside diameter of the cap 24 preferably is slightly larger than the outside diameter of the female member 12 so that the material 13 is tightly wedged between the slightly overlapping resilient beads 22 and 26. Hence the material is secured against pulling out and the female member is held against free rotation. The cut-outs 20 in the cap 24 provide for its more ready flexing to insure tight gripping of the material between the beads irrespective of the thickness of the material.

To facilitate easy insertion or withdrawal of the interlocking stud 14 into or from the socket 15, a plurality of radial slits 27 are provided each of which preferably extends from a point adjacent the reinforcing flange 19, formed in the socket wall 16, to a point closely adjacent the circumferential bead 22. Accordingly, upon insertion of the stud, the socket entrance 18 expands, said expansion being accomplished by the slight flexing of each segment of the body portion 17. Obviously, the more radial slits provided, the greater the yieldability, however, it has been found that four such slits are sufficient to attain the required yieldability without lowering the effectiveness of the firm interlocking action required to retain the stud within the socket. If desired, the reinforced body portion 17 may be rendered more easily flexed without weakening the socket by providing additional slits 28 therein (Fig. 3) at least one between each slit 27, which latter slits extend inwardly radially through the bead 22 and terminate short of the corrugation 21 at the socket entrance 18.

Further flexibility is imparted to the body portion 17 by providing an annular groove 29 in the upper face of said body. This groove also adapts the female member 12 to receive a securing cap of a type shown in Fig. 5 or 7 and which will be described in detail hereinafter.

The structure shown in Fig. 5 is substantially identical to that shown in Fig. 2. In this arrangement the radial slits 27 in the female member 12a extend outwardly through the circumferential reinforcing bead 22. The female member 12a has the same outside diameter as the cap 24a hence the material 13 is firmly gripped instead of being wedged between the companion yieldable beads 22 and 26. The cap 24a also differs from the cap 24 in that circumferentially spaced piercing tangs 30 are struck upwardly in forming the cut-outs 20 in the cap body for piercing the material and engaging in the bead 22 as shown. In assembly, the tangs 30 co-act with the underside of the annular groove 29 and are directed outwardly radially thereby into the bead 22. This double securing arrangement increases the anchorage of the female member.

In Fig. 6 a modified female member 12b is illustrated wherein the body portion is deeply grooved annularly as at 31, to provide a triple wall female member consisting of spaced apart walls 16, 32 and 33. As shown, the walls 16 and 32 are substantially cylindrical and define a socket portion 15. The inner wall 16 preferably is tapered inwardly toward each end and is joined at its upper or entrance end to the upper edge of the wall 32 by the rolled portion 21a. The lower end of the wall 16 is spun inwardly as in the previously described structure to provide an internal reinforcing flange 19. Yieldability is afforded the socket 15 by radial slits 27 which, in this instance, preferably extend from adjacent the reinforcing flange 19 to the juncture of the walls 32 and 33. This structure affords a smooth acting reinforced socket for the stud. The socket is protected from being distorted by the reinforcing bead 22 on the circumferential margin of the wall 33, which bead is in a plane slightly above the top plane of the socket. The female member is shown secured to the material 13 by the cap 24a.

The structure illustrated in Fig. 7 is similar to that shown in Fig. 6, except that here the slits 27 continue through the reinforcing flange 19 to increase the resiliency of the socket. A different form of securing element or cap 24b also is shown, which consists of an annulus having upwardly struck piercing tangs 30a arranged to pass through the material and be engaged in the circumferential bead 22.

It is obvious that the securing elements or caps 24, 24a or 24b may readily be employed with any of the female members herein illustrated.

Although several embodiments of the invention have been illustrated in the accompanying drawing and described in detail in the foregoing specification, it is to be understood that the precise structures disclosed are illustrative rather than restrictive and that the invention is not to be restricted to the precise disclosures but is to embrace such modifications as clearly fall within the spirit of the invention and the scope of the appended claims.

I claim:

1. A snap fastener female member including, in combination, a substantially cylindrical inner wall defining a socket, an internal circumferential flange on one end of said wall, the other end of said wall being of reduced diameter, an outer cylindrical wall integral with but spaced from the inner wall, said cylindrical walls having at least one continuous slit, an external circumferential flange on the free edge of said outer wall, said flange being inclined outwardly upwardly and terminating in a plane above the top plane of the socket, and a reinforcing bead on the edge of said external flange.

2. A snap fastener female member including, in combination, a substantially cylindrical inner wall defining a socket, an internal circumferential flange at one end of said wall, the other end of said wall being of reduced diameter, an outer cylindrical wall integral with but spaced from the inner wall, said cylindrical walls having at least one continuous slit, and an external circumferential flange at one end of said outer wall, said flange being inclined outwardly upwardly and terminating in a plane above the top plane of the socket.

3. A snap fastener female member including, in combination, integral inner and outer substantially cylindrical spaced apart walls to provide a socket, said walls being slit longitudinally to provide resiliency, an internal circumferential flange on the lower edge of the inner wall, and an external circumferential flange on the lower edge of the outer wall, said external flange being inclined outwardly upwardly and terminating in a plane above the top plane of the socket.

HAROLD J. REITER.